(12) United States Patent
Lee et al.

(10) Patent No.: US 8,501,370 B2
(45) Date of Patent: Aug. 6, 2013

(54) BINDER FOR ELECTRODE OF FUEL CELL, ELECTRODE FOR FUEL CELL INCLUDING THE BINDER, METHOD OF MANUFACTURING THE ELECTRODE, AND FUEL CELL USING THE ELECTRODE

(75) Inventors: Myung-jin Lee, Yongin-si (KR); Suk-gi Hong, Yongin-si (KR); Myung-dong Cho, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1495 days.

(21) Appl. No.: 11/846,050

(22) Filed: Aug. 28, 2007

(65) Prior Publication Data

US 2008/0118801 A1 May 22, 2008

(30) Foreign Application Priority Data

Nov. 17, 2006 (KR) .................. 10-2006-0113899

(51) Int. Cl.
*H01M 4/02* (2006.01)
*H01M 4/36* (2006.01)

(52) U.S. Cl.
USPC .................. 429/530; 429/523; 429/400

(58) Field of Classification Search
USPC ........................... 429/530, 523, 400
See application file for complete search history.

(56) References Cited

U.S. PATENT DOCUMENTS

| | | | |
|---|---|---|---|
| 4,223,080 A | 9/1980 | Auborn | |
| 7,662,194 B2 * | 2/2010 | Kim et al. | 429/483 |
| 2004/0009397 A1 | 1/2004 | Kim et al. | |
| 2006/0110632 A1 * | 5/2006 | Hong et al. | 429/40 |
| 2007/0020507 A1 | 1/2007 | Kim et al. | |

FOREIGN PATENT DOCUMENTS

| | | | |
|---|---|---|---|
| JP | 57115819 | * | 7/1982 |
| JP | 2006-19271 | | 1/2006 |
| KR | 10-2004-0005438 | | 1/2004 |
| KR | 10-2006-0001625 | | 1/2006 |
| KR | 10-2006-0034939 A | | 4/2006 |
| WO | WO-03/063266 A2 | | 7/2003 |

OTHER PUBLICATIONS

E. R. Hensema et al., "Syntheses and Properties of Related Polyoxadiazoles and Polytriazoles," Journal of Polymer Science: Part A: Polymer Chemistry, vol. 32, pp. 527-537, 1994.

* cited by examiner

Primary Examiner — Laura Weiner
(74) Attorney, Agent, or Firm — Lee & Morse, P.C.

(57) ABSTRACT

A binder for an electrode of a fuel cell is a basic polymer including a nitrogen-containing functional group and a proton conductive polymer having a phosphoric acid impregnation capacity of 200 wt % or less. An electrode for a fuel cell includes the binder and a catalyst, and a fuel cell includes the electrode. The electrode is manufactured by mixing the binder, a catalyst, and a solvent; and coating the mixture on a carbon support and heat-treating the coated mixture. The binder has excellent proton conductivity by having a phosphoric acid impregnation capacity of 200 wt % or less, and has improved durability without membrane damage and micro-structural changes due to swelling, which occurs when PBI is used as a binder. Accordingly, an electrode including the binder has improved phosphoric acid retention capacity, and increased wetting velocity. Thus, a fuel cell having improved efficiency can be manufactured due to the improved proton conductivity and durability of the electrode.

13 Claims, 2 Drawing Sheets

BINDER FOR ELECTRODE OF FUEL CELL, ELECTRODE FOR FUEL CELL INCLUDING THE BINDER, METHOD OF MANUFACTURING THE ELECTRODE, AND FUEL CELL USING THE ELECTRODE

CROSS-REFERENCE TO RELATED APPLICATION

This application claims the benefit of Korean Application No. 2006-113899, filed Nov. 17, 2006, in the Korean Intellectual Property Office, the disclosure of which is incorporated herein by reference.

BACKGROUND OF THE INVENTION

1. Field of the Invention

Aspects of the present invention relate to a binder for an electrode of fuel cells. More particularly, aspects of the present invention relate to a binder for an electrode of fuel cells that improves proton conductivity by minimizing structural changes of the electrode, improving phosphoric acid retention capacity, and increasing wetting velocity of a catalyst layer. Aspects of the present invention further relate to an electrode for fuel cells including the binder, a method of manufacturing the electrode, and a fuel cell using the electrode.

2. Description of the Related Art

Proton conductors that have excellent and stable proton conductivity at a temperature in the range of 100-300° C. over a long period of time are required in fuel cells in order to provide power generation efficiency, system efficiency, and long-term durability of elements constituting the fuel cells.

In solid polymer electrolyte membrane fuel cells (PEMFCs), which use phosphoric acid as a proton conductor, a sufficient amount of phosphoric acid, as a proton conducting medium, needs to be supplied for electrochemical reactions and high proton conductivity in electrodes. The impregnation degree and distribution of the phosphoric acid in the catalyst layer are important factors affecting cell performance in fuel cells.

Polyvinylidene fluoride (PVDF) and polybenzimidazole (PBI), which are stable in phosphoric acid as electrolytes of a Pt/C catalyst, have been widely used as binders for electrodes of fuel cells. (Japanese Patent Publication No. 2006-019271).

However, when PVDF is used as a binder, the phosphoric acid may not be sufficiently distributed, and fluidity may not be fully controlled. When PBI is used as the binder, the electrode may be partially damaged due to the solubility of PBI in phosphoric acid, and micro-structural changes may occur in the electrode due to swelling of the electrode.

SUMMARY OF THE INVENTION

Aspects of the present invention provide a binder for an electrode of fuel cells, whereby the binder minimizes structural changes of the electrode, improves phosphoric acid retention capacity, and increases wetting velocity.

Aspects of the present invention also provide an electrode for fuel cells including the binder which has improved proton conductivity by minimizing structural changes of the electrode, improves phosphoric acid retention capacity, and increases wetting velocity, and a method of manufacturing the electrode for fuel cells.

Aspects of the present invention also provide a fuel cell having increased efficiency using the electrode for fuel cells.

According to an aspect of the present invention, there is provided a binder for an electrode of a fuel cell. The binder is a basic polymer including a basic nitrogen-containing functional group in a polymer chain. The binder is proton conductive and has a phosphoric acid impregnation capacity of 200 wt % or less.

According to another aspect of the present invention, there is provided an electrode for fuel cells including the binder and a catalyst.

According to another aspect of the present invention, there is provided a method of manufacturing an electrode for fuel cells, the method including: forming an electrode catalyst layer forming composition by mixing the binder, a catalyst, and a solvent; and forming an electrode by coating electrode catalyst layer forming composition on a carbon support and heat-treating the coated composition.

According to another aspect of the present invention, there is provided an electrode for a fuel cell formed by a method comprising forming an electrode catalyst layer forming composition by mixing a binder, a catalyst, and a solvent, wherein the binder is a basic polymer comprising a basic nitrogen-containing functional group in a polymer chain, and wherein the binder is proton conductive and has a phosphoric acid impregnation capacity of 200 wt % or less; and coating the electrode catalyst layer forming composition on a carbon support and heat-treating the coated composition to form the electrode According to another aspect of the present invention, there is provided a fuel cell including a cathode, an anode, and an electrolyte membrane interposed between the cathode and the anode, wherein at least one of the cathode and the anode includes the binder and a catalyst.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
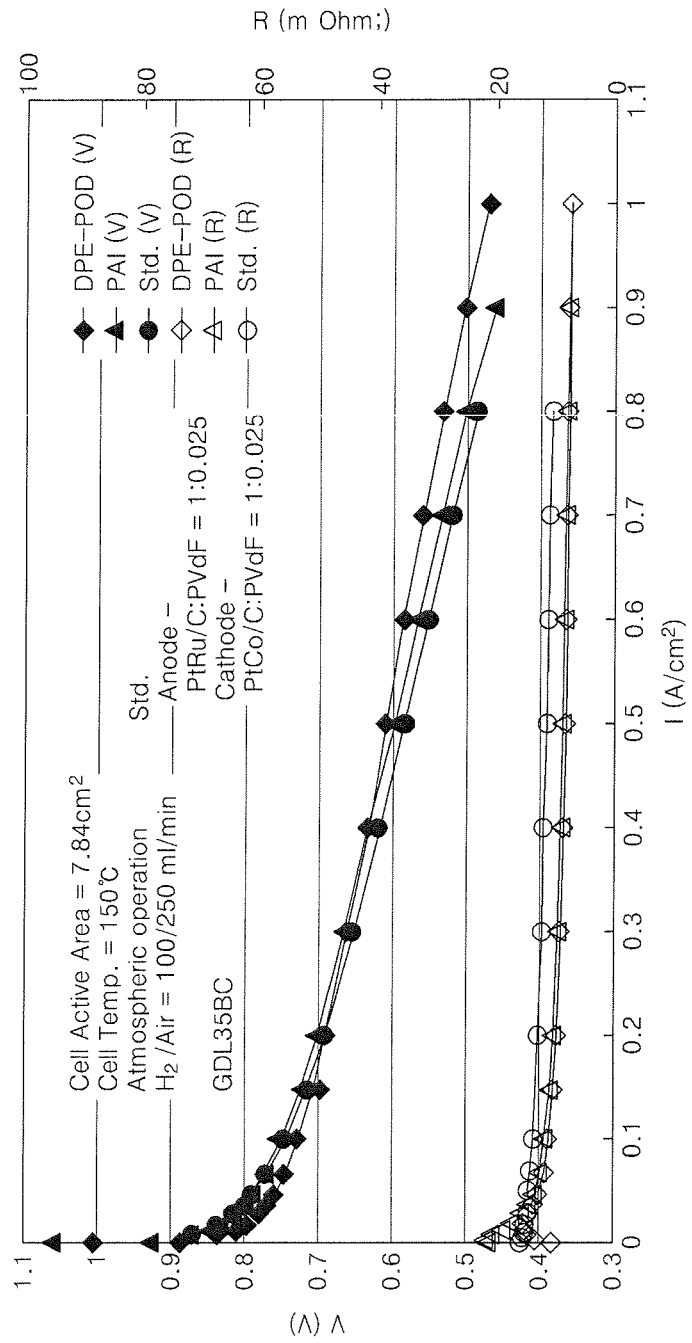
FIG. 1 is a graph illustrating voltages according to current densities of fuel cells prepared according to Examples 1-2 and Comparative Example 1.

Reference will now be made in detail to the present embodiments of the present invention, examples of which are illustrated in the accompanying drawings, wherein like reference numerals refer to the like elements throughout. The embodiments are described below in order to explain the present invention by referring to the figures. The invention may, however, be embodied in many different forms and should not be construed as being limited to the embodiments set forth herein; rather, these embodiments are provided so that this disclosure will be thorough and complete, and will fully convey the concept of the invention to those skilled in the art.

A binder for an electrode of fuel cells according to an embodiment of the present invention (herein referred to as "Binder A" or "the binder") has an excellent proton conductivity of 0.0001 S/cm or higher at 150° C. even when a phosphoric acid is impregnated into a binder membrane, and the amount of impregnated phosphoric acid is 200 wt % or less since the binder is a basic polymer including a basic nitrogen-containing functional group, and thus the structure of the electrode is not changed.

Binder A may be poly(1,3,4-oxadiazoles) (POD) represented by Formula 1, poly(amide imide) (PAI) represented by Formula 2, or a mixture thereof.

Formula 1

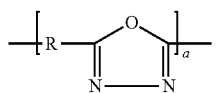

wherein R is a substituted or unsubstituted C6-C30 arylene group, a substituted or unsubstituted C6-C30 heteroarylene group, a substituted or unsubstituted C6-C30 aralkylene group, or

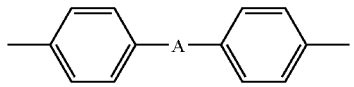

wherein A is —O—, —CH$_2$—, —C(CH$_3$)$_2$—, —C(CF$_3$)$_2$—, —CH(CH$_3$)—, —S—, or —C(=O)—, and
a is an integer of 50-500.

Formula 2

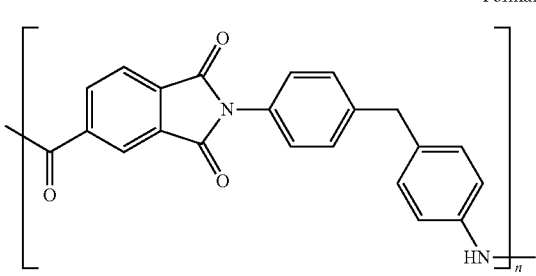

wherein, n is an integer of 50-300.
As a non-limiting example, R may be represented by formulae below.

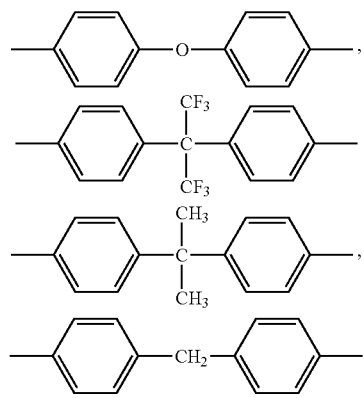

The expression "phosphoric acid impregnation capacity" will now be described.

The expression "phosphoric acid impregnation capacity of 200 wt % or less" indicates that when a binder membrane is impregnated with phosphoric acid, 200 parts by weight or less of phosphoric acid, and preferably 150-200 parts by weight of phosphoric acid is impregnated based on 100 parts by weight of the total amount of the binder membrane before the phosphoric acid is impregnated. In this condition, the proton conductivity is 0.0001 S/cm or higher, and may be 0.005-0.01 S/cm. The phosphoric acid impregnation capacity is calculated using the difference between the total weight of the binder membrane before being impregnated with phosphoric acid and the total weight of the binder membrane after being impregnated with phosphoric acid.

Polyoxadiazole (POD) represented by Formula 1 may be prepared according to any suitable method such as, for example, a method described in Journal of Polymer Science: Part A: Polymer Chemistry Vol. 32 527 (1994).

PAI represented by Formula 2 may be prepared by any suitable method or may be purchased from a commercial source such as, for example, Aldrich Co.

The weight average molecular weight of POD represented by Formula 1 and PAI represented by Formula 2 may be in the range of 40,000-200,000. When the weight average molecular weights of POD and PAI are less than 40,000, the mechanical strength of an electrode is too weak. On the other hand, when the weight average molecular weights of POD and PAI are greater than 200,000, solvent dissolving polymers that are used to form a membrane are not sufficiently present.

POD represented by Formula 1 may be DPE-POD represented by Formula 3 or HF-POD represented by Formula 4.

Formula 3

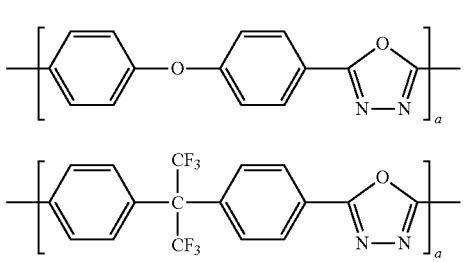

Formula 4

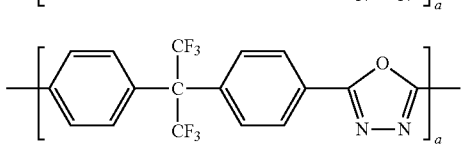

Here, a is an integer of 50-500.

Binder A may be effectively used in an electrode of a high-temperature fuel cell that operates at 150° C. or higher.

Hereinafter, a method of manufacturing an electrode for fuel cells will be described.

First, a composition that is used to form an electrode catalyst layer (hereinafter referred to as the "electrode catalyst layer-forming composition") is formed by mixing Binder A, a catalyst, and a solvent.

Then, an electrode is formed by coating the electrode catalyst layer-forming composition on a carbon support and heat treating the coated composition.

The amount of the binder may be in the range of 0.5-10 parts by weight based on 100 parts by weight of the catalyst. As a specific non-limiting example, the amount of the binder may be 1-5 parts by weight. When the amount of the binder is less than 0.5 parts by weight based on 100 parts by weight of the catalyst, the binder cannot perform its role. On the other hand, when the amount of the binder is greater than 10 parts by weight based on 100 parts by weight of the catalyst, the catalyst activity may decrease since the amount of the catalyst is relatively reduced.

Platinum may be used as the catalyst. Also, an alloy or a mixture of platinum and at least one selected from the group consisting of gold, palladium, rhodium, iridium, ruthenium, tin, molybdenum, cobalt, and chrome may be used as the catalyst.

In addition to the binder according to aspects of the present invention as described above, at least one of poly(vinylidene fluoride), polytetrafluoroethylene, a tetrafluoroethylene-hexafluoroethylene copolymer, and polyperfluoroethylene may be used as an auxiliary binder. When the auxiliary binder is used together with Binder A according to aspects of the present invention, the performance can be improved since Binder A and the auxiliary binder introduce proton conductivity into the electrode.

The amount of the auxiliary binder may be in the range of 5-100 parts by weight based on 100 parts by weight of Binder A.

The solvent may be N-methylpyrrolidone (NMP), dimethylacetateamide (DMAc), or the like, and the amount of the solvent may be in the range of 300-600 parts by weight based on 100 parts by weight of the catalyst. When the amount of the solvent is not within the range described above, the processability of the electrode materials is lowered.

The carbon support may be fixed on a glass substrate to facilitate coating the electrode catalyst layer-forming composition thereon. The coating may be performed using a doctor blade coating method, a bar coating method, a screen printing method, or the like, but the coating method is not limited thereto.

The electrode catalyst layer-forming composition is coated onto the carbon support and heat treated at a temperature in the range of 80-180° C. to evaporate the solvent. The coated electrode catalyst layer-forming composition may be heat treated for 10-60 minutes, but the heat treatment time may vary according to the heat treatment temperature. As a non-limiting example, the coated electrode catalyst layer-forming composition may be heat treated at 80° C. for longer than 1 hour, at 120° C. for longer than 10 minutes, and at 150° C. for longer than 10 minutes.

An electrolyte membrane used in a fuel cell according to an aspect of the present invention may be any electrolyte membrane that is commonly used in fuel cells. For example, a polybenzimidazole electrolyte membrane, a polybenzooxazine-polybenzimidazole copolymer electrolyte membrane, and a polytetrafluoroethylene porous membrane may be used as the electrolyte membrane.

The carbon support may be carbon paper, such as, for example, water-repellent carbon paper and or water-repellent carbon paper to which a water-repellent carbon black layer is applied or carbon cloth.

The water-repellent carbon paper includes a hydrophobic polymer such as polytetrafluoroethylene (PTFE). The hydrophobic polymer may be sintered. A gas diffusion layer is treated to be water-repellent to maintain the entry/exit path of both polar liquid reactant and gaseous reactants.

In the water-repellent carbon paper having the water-repellent carbon black layer, the water-repellent carbon black layer includes carbon black and a hydrophobic polymer, such as PTFE, as a hydrophobic binder. The water-repellent carbon black layer is applied to a side of the water-repellent carbon paper. The hydrophobic polymer in the water-repellent carbon black layer is sintered.

Further, a fuel cell according to an embodiment of the present invention may include a cathode, an anode, and an electrolyte membrane interposed between the cathode and the anode, wherein at least one of the cathode and anode includes the binder of the present invention and a catalyst.

The cathode and anode respectively may include a diffusion layer in addition to the catalyst layer.

The fuel cell according to the current embodiment of the present invention may be used for home fuel cells. The home fuel cells may be prepared using any method that is commonly used in manufacturing fuel cells, and thus the method will not be described here in detail.

Aspects of the present invention will now be described in greater detail with reference to the following examples. The following examples are for illustrative purposes only and are not intended to limit the scope of the invention

SYNTHESIS EXAMPLE 1

Synthesis of the DPE-POD Represented by Formula 3

180 g of polyphosphoric acid, 30 g (0.08 mole) of diphenyletherdicarboxylic acid and 12 g (0.09 mole) of hydrazine sulfate were added to a four neck round bottomed flask under a nitrogen atmosphere, and the flask was heated to 100° C. Then, the flask was heated to 175° C., and stirred for 18 hours.

The mixture was precipitated in distilled water and neutralized with an NaOH aqueous solution. The resulting polymer was dried at 80° C. for 24 hours and dried at 60° C. in an oven in a vacuum to prepare the DPE-POD represented by Formula 3.

The structure of the DPE-POD of Formula 3 was confirmed by nuclear magnetic resonance (NMR) spectroscopy.

SYNTHESIS EXAMPLE 2

Synthesis of the HF-POD Represented by Formula 4

180 g of polyphosphoric acid, 30 g (0.08 mole) of diphenylhexafluoroisopropylidene dicarboxylic acid and 12 g (0.09 mole) of hydrazine sulfate were added to a four neck round bottomed flask under a nitrogen atmosphere, and the flask was heated to 100° C. Then, the flask was heated to 175° C., and stirred for 18 hours.

The mixture was precipitated in distilled water and neutralized with an NaOH aqueous solution. The resulting polymer was dried at 80° C. for 24 hours and dried at 60° C. in an oven in a vacuum to prepare the HF-POD represented by Formula 4.

The structure of the HF-POD of Formula 4 was confirmed by NMR spectroscopy.

EXAMPLE 1

1.0 g of PtCo/C, 0.03 g of the DPE-POD represented by Formula 3, 3.5 g of NMP as a solvent were mixed at room temperature and stirred for 5 minutes to prepare a slurry to be used to form a cathode catalyst layer.

The slurry to be used to form the cathode catalyst layer was coated onto carbon paper as a carbon support using a coating bar, and the coated slurry was dried at 80° C. for 1 hour, at 120° C. for 30 minutes, and at 150° C. for 10 minutes to prepare a cathode.

1.0 g of PtRu/C, 0.012 g of the DPE-POD represented by Formula 3, 0.018 g of polyvinylidene fluoride and 3.5 g of NMP as a solvent were mixed and stirred at room temperature for 5 minutes to prepare a slurry to be used to form an anode catalyst layer.

The slurry to be used to form the anode catalyst layer was coated on carbon paper as a carbon support using a coating bar, and the coated slurry was dried at 80° C. for 1 hour, at 120° C. for 30 minutes, and at 150° C. for 10 minutes to prepare an anode.

A polybenzooxazine-polybenzimidazole copolymer was used as an electrolyte membrane and was interposed between the cathode and the anode to prepare a fuel cell. The fuel cell was operated at an operating temperature of 150° C. while air was supplied to the cathode at 250 ml/min and hydrogen was supplied to the anode at 100 ml/min.

EXAMPLE 2

A cathode, an anode and a fuel cell were prepared in the same manner as in Example 1, except that a polyamide imide (PAI) was used instead of the DPE-POD represented by Formula 3 in preparing the slurries used to form the anode and cathode catalyst layers. The amount of catalyst (PtCo) loading in the cathode was 1.91 mg/cm$^2$, and the amount of catalyst (PtRu) loading in the anode was 1.22 mg/cm$^2$.

A polybenzooxazine-polybenzimidazole copolymer was used as the electrolyte membrane of the fuel cell. The fuel cell was operated at an operating temperature of 150° C. under non-humidifying conditions while air was supplied to the cathode at 250 ml/min and hydrogen was supplied to the anode at 100 ml/min.

EXAMPLE 3

A cathode, an anode and a fuel cell were prepared in the same manner as in Example 1, except that the HF-POD represented by Formula 4 was used instead of the DPE-POD represented by Formula 3 in preparing the slurries used to form the anode and cathode catalyst layers. The amount of catalyst (PtCo) loading in the cathode was 1.78 mg/cm$^2$, and the amount of catalyst (PtRu) loading in the anode was 1.22 mg/cm$^2$.

A polybenzooxazine-polybenzimidazole copolymer was used as the electrolyte membrane of the fuel cell. The fuel cell was operated at an operating temperature of 150° C. under non-humidifying conditions while air was supplied to the cathode at 250 ml/min and hydrogen was supplied to the anode at 100 ml/min.

COMPARATIVE EXAMPLE 1

Electrodes were prepared in the same manner as in Example 1, except that 0.025 g of polyvinylidene fluoride was used instead of the DPE-POD represented by Formula 3 in preparing the slurries used to form the anode and cathode catalyst layers.

EVALUATION EXAMPLE 1

Measuring the Amount of Impregnated Phosphoric Acid and Swelling Ratio

An HF-POD membrane, a polyamide imide membrane (Aldrich Co.) and a polybenzimidazole membrane were prepared using the HF-POD prepared according to Synthesis Example 2, polyamide imide (Aldrich Co.) and polybenzimidazole. The membranes were impregnated with 85 wt % of phosphoric acid at 80° C. for 60 minutes.

Then, the amount of impregnated phosphoric acid and the swelling ratio of the HF-POD membrane, the polyamide imide membrane and the polybenzimidazole membrane were measured. To do this, the membranes were impregnated with phosphoric acid at 80° C. for 60 minutes and cooled to room temperature, and the amount of impregnated phosphoric acid was calculated using the difference between the total weight of the membranes before being impregnated and the total weight of the membranes after being impregnated and cooled to room temperature. The swelling ratio was calculated using the difference in area of the membranes before being impregnated and after being impregnated and cooled to room temperature.

The results are shown in Table 1.

TABLE 1

|  | Amount of impregnated phosphoric acid (wt %) | Area A* (cm × cm) | Area B** (cm × cm) | Swelling ratio (%) |
|---|---|---|---|---|
| PBI | 360 | 5.2 × 5.4 | 7.4 × 7.8 | 5.50 |
| PAI | 145 | 5.0 × 5.2 | 5.3 × 5.6 | 0.14 |
| HF-POD | 189 | 5.2 × 4.9 | 5.3 × 4.9 | 0.04 |

*Area A is an area of the membrane before being impregnated with phosphoric acid.
**Area B is an area of the membrane after being impregnated with phosphoric acid and cooled to room temperature.

Referring to Table 1, PAI and HF-POD had less impregnated phosphoric acid and a lower swelling ratio compared to PBI.

EVALUATION EXAMPLE 2

Evaluation of Ionic Conductivity

A DPE-POD membrane, a HF-POD membrane and a PAI membrane were prepared using DPE-POD prepared in Synthesis Example 1, HF-POD prepared in Synthesis Example 2 and polyamide imide (PAI) (Aldrich Co.), and the membranes were impregnated with 85 wt % of phosphoric acid at 80° C. for 60 minutes.

Then, ionic conductivities of the impregnated DPE-POD membrane, HF-POD membrane and PAI membrane were calculated by measuring resistance according to temperature changes from 25 to 150° C. at a frequency in the range of 1 Hz to 1 MHz at a bias voltage of 10 mV (vs. O.C.V). The high-temperature stability of the DPE-POD membrane, the HF-POD membrane and the PAI membrane could be evaluated by measuring changes in ionic conductivity according to time at a high temperature.

The results are shown in Table 2.

TABLE 2

| Temperature (° C.) | PAI (S/cm) | DPE-POD (S/cm) | HF-POD (S/cm) | PBI (S/cm) |
|---|---|---|---|---|
| 25 | $4.05 \times 10^{-4}$ | $7.23 \times 10^{-3}$ | $5.47 \times 10^{-3}$ | $8.56 \times 10^{-2}$ |
| 50 | $4.97 \times 10^{-4}$ | $8.66 \times 10^{-3}$ | $7.56 \times 10^{-3}$ | $1.10 \times 10^{-2}$ |
| 80 | $7.57 \times 10^{-4}$ | $1.10 \times 10^{-2}$ | $9.62 \times 10^{-3}$ | $1.30 \times 10^{-2}$ |
| 100 | $5.60 \times 10^{-4}$ | $1.31 \times 10^{-2}$ | $1.05 \times 10^{-2}$ | $1.40 \times 10^{-2}$ |
| 120 | $5.33 \times 10^{-4}$ | $1.59 \times 10^{-2}$ | $1.23 \times 10^{-2}$ | $1.10 \times 10^{-2}$ |
| 150 | $2.15 \times 10^{-4}$ | $9.54 \times 10^{-3}$ | $9.49 \times 10^{-3}$ | $1.06 \times 10^{-2}$ |

As shown in Table 1, the amount of impregnated phosphoric acid of the PAI membrane, the HF-POD membrane and the DPE-POD membrane, was less than the amount of impregnated phosphoric acid of a membrane using PBI (Table 1, the amount of impregnated phosphoric acid: 360%, and the swelling ratio: 5.5% ). Thus, as shown in Table 2, the ionic conductivities of the PAI membrane, the HF-POD membrane and the DPE-POD membrane were less than the ionic conductivity of a membrane using PBI. Such results are obtained since the ionic conductivity is generally proportional to the amount of impregnated phosphoric acid. The amounts of impregnated phosphoric acid are different between the PAI, DPE-POD and HF-POD membranes and in the PBI membrane, and thus the ionic conductivities thereof cannot directly be compared to each other.

However, when the PAI and HF-POD were used, the structure of the electrode did not change since the swelling ratio did not change significantly in the electrode as shown in Table 1, and thus problems that may occur in conventional PBI membranes were overcome.

Figure 2:
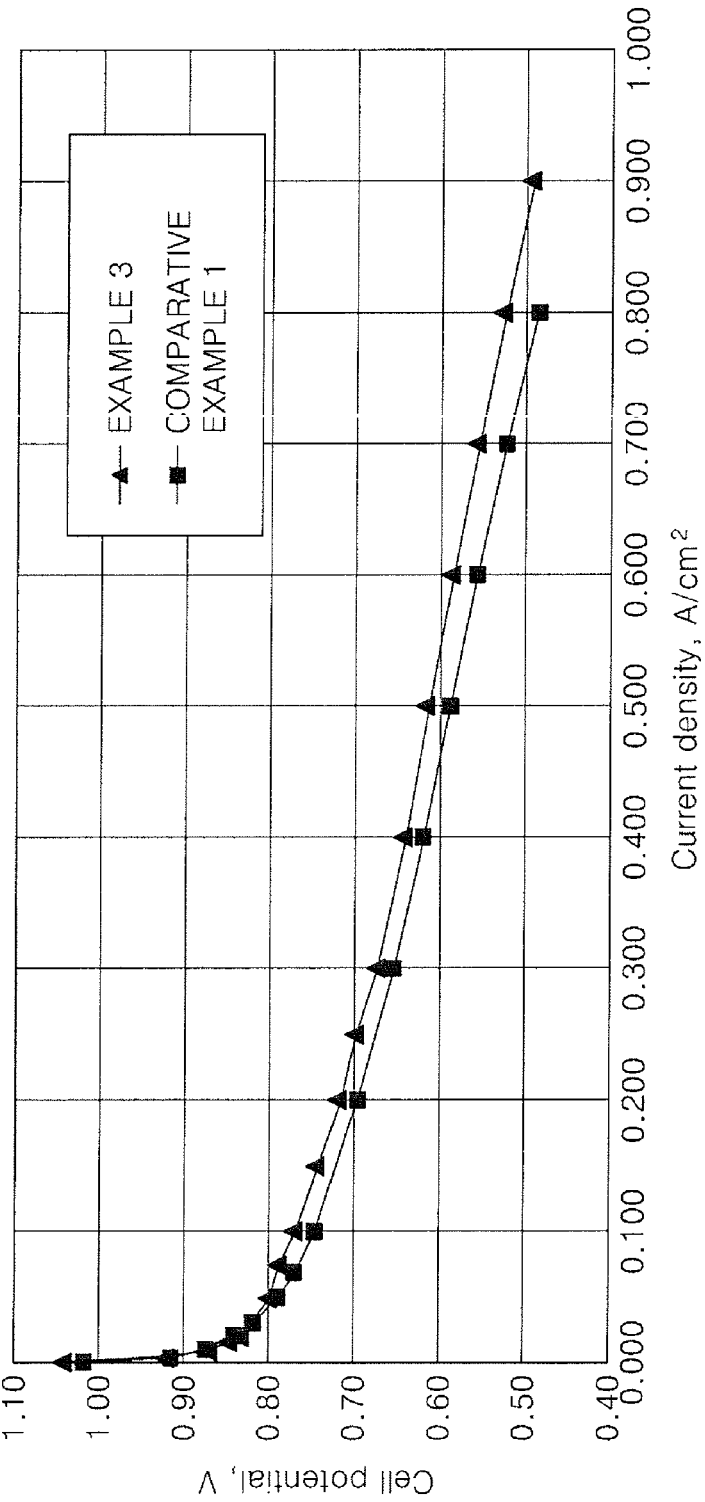
FIG. 2 is a graph illustrating voltages according to current densities of fuel cells prepared according to Example 3 and Comparative Example 1.

FIG. 1 is a graph illustrating voltage and resistance changes according to current densities of the fuel cells prepared according to Examples 1-2 and Comparative Example 1. FIG. 2 is a graph illustrating voltage changes according to current densities of the fuel cells prepared according to Example 3 and Comparative Example 1. (In FIG. 1, Example 1 is labeled as "DPE-POD," Example 2 is labeled as "PAI" and Comparative Example 1 is labeled as "Std.") The results illustrated in FIGS. 1 and 2 are summarized in Table 3.

TABLE 3

|  | V @ 0.3 A/cm² |
|---|---|
| Polyvinylidene fluoride(Comparative Example 1) (Std.) | 0.653 |
| PAI (Example 2) | 0.667 |
| DPE-POD (Example 1) | 0.661 |
| HF-POD (Example 3) | 0.674 |

Referring to FIG. 1 and Table 3, voltage properties according to current density were improved in Examples 1-2 compared to those in Comparative Example 1.

Further, referring to FIG. 2 and Table 3, the fuel cell prepared according to Example 3 had improved voltage properties according to current density compared to the fuel cell prepared in Comparative Example 1.

The binder for an electrode of fuel cells according to aspects of the present invention has excellent proton conductivity by having an impregnation amount of phosphoric acid of 200 wt % or less, and improved durability without membrane damage and micro-structural changes due to swelling, which occur when PBI is used as a binder. Accordingly, the electrode including the binder of the present invention has an improved phosphoric acid retention capacity and increased wetting velocity. Thus, a fuel cell having improved efficiency can be manufactured due to improved proton conductivity and durability.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode for a fuel cell, comprising a binder and a catalyst, wherein the binder includes at least one of a polyoxadiazole-based compound represented by Formula 1 and a poly(amide imide) represented by Formula 2:

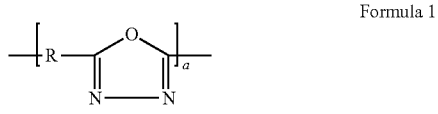

Formula 1 wherein R is selected from the group consisting of a substituted or unsubstituted C6-C30 arylene group, a substituted or unsubstituted C6-C30 heteroarylene group, a substituted or unsubstituted C6-C30 aralkylene group, and

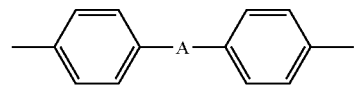

wherein A is selected from the group consisting of —O—, —CH$_2$—, —C(CH$_3$)$_2$—, —C(CF$_3$)$_2$—, —CH(CH$_3$)—, —S—, and —C(=O)—, and wherein a is an integer of 50-500;

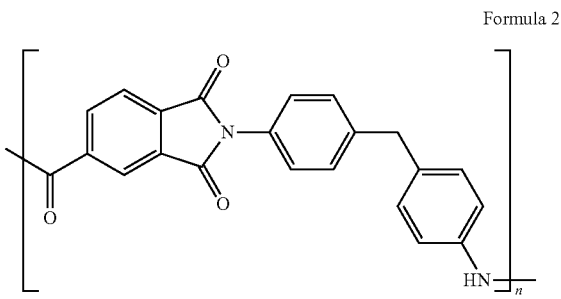

Formula 2 wherein n is an integer of 50-300.

2. The electrode of claim 1, wherein the binder includes the polyoxadiazole-based compound represented by Formula 1 and wherein R in Formula 1 is selected from the groups represented by the formulae below:

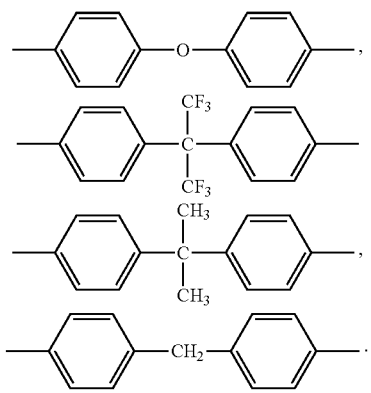

3. The electrode of claim 1, wherein the binder includes a polyoxadiazole-based compound represented by Formula 1, and wherein the compound represented by Formula 1 is represented by Formula 3 or 4:

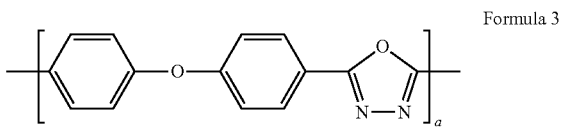

Formula 3

-continued

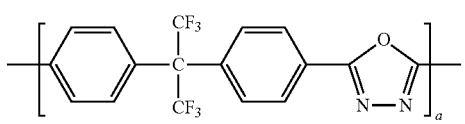
Formula 4 wherein a is an integer of 50-500.

4. The electrode of claim 1, wherein the amount of the binder is in the range of 0.5-10 parts by weight based on 100 parts by weight of the catalyst.

5. The electrode of claim 1, further comprising an auxiliary binder selected from the group consisting of poly(vinylidene fluoride), polytetrafluoroethylene, a tetrafluoroethylene-hexafluoroethylene copolymer and polyperfluoroethylene.

6. The electrode of claim 5, wherein the amount of the auxiliary binder is in the range of 5-100 parts by weight based on 100 parts by weight of the binder.

7. A method of manufacturing an electrode for a fuel cell, the method comprising:
forming an electrode catalyst layer forming composition by mixing a binder, a catalyst, and a solvent; and
forming an electrode by coating the electrode catalyst layer forming composition on a carbon support and heat-treating the coated composition, wherein the binder includes at least one of a polyoxadiazole-based compound represented by Formula 1 and a poly(amide imide) represented by Formula 2:

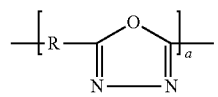
Formula 1 wherein R is selected from the group consisting of a substituted or unsubstituted C6-C30 arylene group, a substituted or unsubstituted C6-C30 heteroarylene group, a substituted or unsubstituted C6-C30 aralkylene group, and

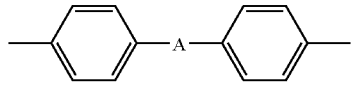

wherein A is selected from the group consisting of —O—, —CH$_2$—, —C(CH$_3$)$_2$—, —C(CF$_3$)$_2$—, —CH(CH$_3$)—, —S—, and —C(=O)—, and
wherein a is an integer of 50-500;

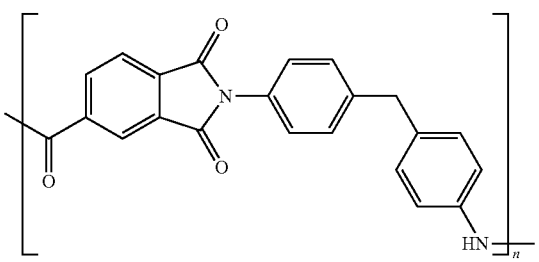
Formula 2 wherein n is an integer of 50-300.

8. A fuel cell comprising a cathode, an anode, and an electrolyte membrane interposed between the cathode and the anode, wherein at least one of the cathode and the anode comprise a binder and a catalyst, wherein the binder includes at least one of a polyoxadiazole-based compound represented by Formula 1 and a poly(amide imide) represented by Formula 2:

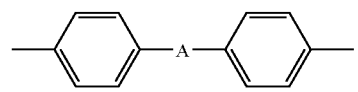
Formula 1 wherein R is selected from the group consisting of a substituted or unsubstituted C6-C30 arylene group, a substituted or unsubstituted C6-C30 heteroarylene group, a substituted or unsubstituted C6-C30 aralkylene group, and

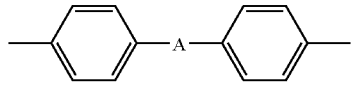

wherein A is selected from the group consisting of —O—, —CH$_2$—, —C(CH$_3$)$_2$—, —C(CF$_3$)$_2$—, —CH(CH$_3$)—, —S—, and —C(=O)—, and
wherein a is an integer of 50-500;

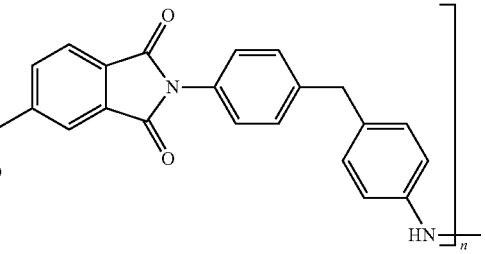
Formula 2 wherein n is an integer of 50-300.

9. The fuel cell of claim 8, wherein the binder includes the-polyoxadiazole-based compound represented by Formula 1 and wherein R in Formula 1 is selected from the groups represented by the formulae below:

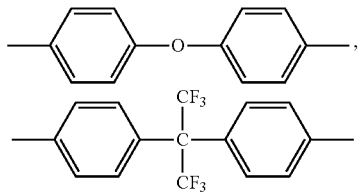

-continued

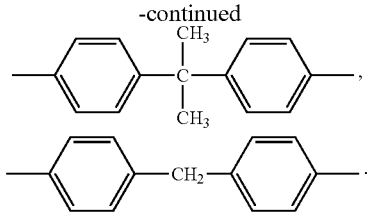

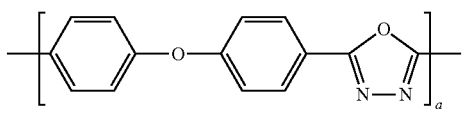

10. The fuel cell of claim 9, wherein the binder includes the polyoxadiazole-based compound represented by Formula 1, and wherein the compound represented by Formula 1 is represented by Formula 3 or 4:

Formula 3

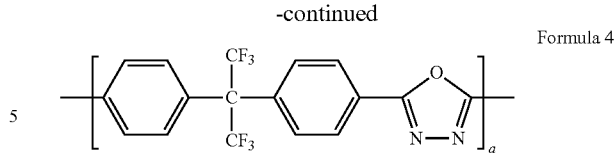

Formula 4 wherein a is an integer of 50-500.

11. The fuel cell of claim 8, wherein the amount of the binder is in the range of 0.5-10 parts by weight based on 100 parts by weight of the catalyst.

12. The fuel cell of claim 8, wherein the at least one of the anode and cathode further comprises at least one auxiliary binder selected from the group consisting of poly(vinylidene fluoride), a polytetrafluoroethylene, a tetrafluoroethylene-hexafluoroethylene copolymer and polyperfluoroethylene.

13. The fuel cell of claim 12, wherein the amount of the auxiliary binder is in the range of 5-100 parts by weight based on 100 parts by weight of the binder.

* * * * *